US006743279B2

(12) United States Patent
Cataldo

(10) Patent No.: US 6,743,279 B2
(45) Date of Patent: Jun. 1, 2004

(54) AIR PURIFICATION DEVICE FOR AIR HANDLING UNITS

(75) Inventor: Edward Cataldo, Lake Katrine, NY (US)

(73) Assignee: Airborne Contaminant Systems, LLC, Lake Katrine, NY (US)

(*) Notice: Subject to any disclaimer, the term of this patent is extended or adjusted under 35 U.S.C. 154(b) by 32 days.

(21) Appl. No.: 10/150,371

(22) Filed: May 17, 2002

(65) Prior Publication Data

US 2003/0213362 A1 Nov. 20, 2003

(51) Int. Cl.⁷ ................................................ B01D 47/06
(52) U.S. Cl. .................... 95/228; 96/227; 96/266; 96/322; 422/4; 422/28
(58) Field of Search .............. 422/4, 28, 120, 422/124, 123; 96/223, 226, 227, 266, 322, 280, 270, 273, 277; 95/225, 228, 229, 227

(56) References Cited

U.S. PATENT DOCUMENTS

| 175,291 | A | * | 3/1876 | Lount |
| 2,279,938 | A | * | 4/1942 | Crawford |
| 2,280,633 | A | * | 4/1942 | Crawford |
| 2,798,570 | A | * | 7/1957 | Kelley |
| 2,852,090 | A | * | 9/1958 | Kelley |
| 2,876,833 | A | * | 3/1959 | Kelley et al. |
| 3,018,231 | A | * | 1/1962 | Valentine et al. |
| 3,824,770 | A | | 7/1974 | Eckstein |
| 4,410,339 | A | * | 10/1983 | Bachhofer et al. |
| 4,440,698 | A | | 4/1984 | Bloomer |
| 4,955,205 | A | * | 9/1990 | Wilkinson |
| 5,180,528 | A | | 1/1993 | Kaplan |
| 5,226,935 | A | | 7/1993 | Wolff et al. |
| 5,286,447 | A | * | 2/1994 | Fannin et al. |
| 5,389,120 | A | | 2/1995 | Sewell et al. |
| 5,466,399 | A | * | 11/1995 | Von Kempski et al. |
| 5,531,800 | A | | 7/1996 | Sewell et al. |
| 5,531,801 | A | | 7/1996 | Sewell et al. |
| 5,648,046 | A | * | 7/1997 | Weibel |
| 5,683,479 | A | | 11/1997 | Gillingham et al. |
| 5,756,047 | A | * | 5/1998 | West et al. |
| 5,842,245 | A | | 12/1998 | Pai |
| 5,908,494 | A | | 6/1999 | Ross et al. |
| 5,911,742 | A | * | 6/1999 | Akazawa |
| 6,019,819 | A | | 2/2000 | Williams |
| 6,063,170 | A | | 5/2000 | Diebert |

* cited by examiner

Primary Examiner—Duane S. Smith
(74) Attorney, Agent, or Firm—Scully, Scott, Murphy & Presser

(57) ABSTRACT

An air handling unit having a unique air treatment device, and a method for retrofitting existing air handling units to include the air treatment device. The air handling unit includes a casing defining a space for conditioning air, and forming an inlet and an outlet; a cooling coil supplied by a central chiller system and disposed inside the casing; a sump located below the cooling coil; and a supply air blower for drawing air into the casing, and forcing air through the cooling coil. The air handling unit further includes a spray header secured inside the casing, adjacent the cooling coil; and a pumping system for delivering liquid solution from the sump and pumping the solution onto the cooling coil and the solution flows downward over the cooling coil and into the sump below, and the solution treats the air flowing through the cooling coil. In a preferred embodiment, the liquid solution is an anti-bacteria solution, and the solution kills bacteria in the air forced through the cooling coil structure. The liquid spray air treatment device may be effectively operated to kill even extremely small bacteria such as anthrax.

**

AIR PURIFICATION DEVICE FOR AIR HANDLING UNITS

BACKGROUND OF THE INVENTION

1. Field of the Invention

This invention generally relates to a liquid flow air treatment device. In a preferred embodiment, more specifically, the invention relates to a highly effective liquid flow air purification device that can be easily installed, on a retrofit basis, on many existing air handling units, and to air handling units provided with such an air purification device.

2. Prior Art

Interior spaces of buildings are typically supplied with automatically controlled temperatures using one or more air handling units that furnish a recirculating flow of air drawn out of the conditioned space, flowed through the air handling unit by an air blower therein, heated or cooled as necessary within the unit, and then flowed back into the conditioned space. In addition to supplying the desired temperature control within the conditioned space, air handing units of this general type may also be provided with the capability of purifying, at least to some extent, air flowing through the units.

The most common device used for this air purification task is the familiar replaceable flow-through air filter element that is disposed within the unit cabinet structure in the path of air being forced therethrough on its way back to the conditioned space served by the unit. Filters of this type are typically formed from a matted fibrous material (such as fiberglass) that serves to trap particulate matter, such as dust, borne in the air entering the unit. Additionally, electrostatic air filters are often incorporated in air handling units and provide improved particulate removal performance due to their electrostatic attraction and trapping of particulates substantially smaller than that which the ordinary fibrous filter can effectively capture.

However, as is well known, undesirable air pollutants are present in a variety of forms other than the relatively easy to capture particulates that the fibrous and electrostatic filter structures are designed to remove from the recirculated air. Another known type of air purification process is the use of a liquid spray, typically a water-based spray, directed against a filter element through which air to be supplied to a conditioned space is flowed. The liquid spray is maintained in continuous contact with the flowing air traversing the filter element, and, depending on the type of air purification system in which it is incorporated, serves to entrain a variety of airborne particulates as well as other types of pollutants such as aerosols, nitrogen oxides, sulfur oxides, carbon dioxides and monoxides, hydrogen sulfides and hydrocarbons. The liquid can then be drained away carrying entrained pollutants with it. This general type of air purification system also desirably serves to humidify the air delivered to the conditioned space.

These prior art air purification devices are suitable for many purposes. Typically, however, these prior art devices are not one hundred percent effective, and thus are not well suited for some important applications. For example, these devices may be inadequate to protect the occupants of a building from an intentional biological attack, where extremely toxic bacteria, such as anthrax, are intentionally introduced into the air inside the building. Also, these prior art devices, in their conventional form, may not provide the desired sterilization for surgical and other environments that require extremely clean air. Moreover, many of the prior art devices are relatively expensive or require relatively expensive maintenance. In addition, these types of systems are designed for smaller applications; not office buildings (air volume).

SUMMARY OF THE INVENTION

An object of the present invention is to provide a very simple, yet highly effective liquid spray air treatment device.

Another object of this invention is to provide a very simple and inexpensive method for retrofitting many existing air handling units to include an extremely effective air purification device.

A further object of the invention is to provide an air handling unit with a very simple and highly effective liquid flow air purification system.

A further object of the invention is to deliver a chlorinated solution onto a plate-fin cooling coil of an air handling unit to kill bacteria as air passes over the surface of the cooling coil fins.

Another object of this invention is to provide a control system for an air purification device in an air handling unit that automatically monitors and controls operation of the air purification device.

These and other objectives are attained with an air handling unit having a unique air treatment device, and a method for retrofitting existing air handling units to include the air treatment device. The air handling unit comprises a casing defining a space for conditioning air, and forming an inlet and an outlet; a cooling coil located inside the casing for cooling air therein; a sump located below the cooling unit for collecting liquid condensate on the cooling coil; and a supply air blower for drawing air into the casing, through the inlet, and forcing air through the cooling coil and outward through the outlet. The air handling unit further comprises a spray header secured inside the casing, adjacent to the cooling coil; and a pumping system connected to the sump and to the spray header for drawing chlorinated liquid solution from the sump and pumping the solution to and through the spray header, wherein the spray header sprays the solution onto the cooling coil and the solution flows downward over the cooling coil and into the sump below, and the solution treats the air passing over the surface of the cooling coils.

In a preferred embodiment, the liquid solution is an anti-bacteria solution, and the solution kills bacteria in the air forced through the cooling coil. Also, in this preferred embodiment, the cooling coil is of the plate-fin type—that is, the coil is comprised of a serpentine shaped coil extending between two parallel end plates or supports, with a series of thin, parallel fins pr plates mounted on the coil, and for example, these fins may be spaced apart from $\frac{1}{8}$ inch to $\frac{3}{32}$ inch. With these features, the spray header and the cooling coil may be used to develop and to maintain continuously a liquid flow filter that forces contact between the liquid flow and even extremely small particulates in the air stream. As a result, the liquid spray air treatment device is able to kill even extremely small bacteria such as anthrax.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
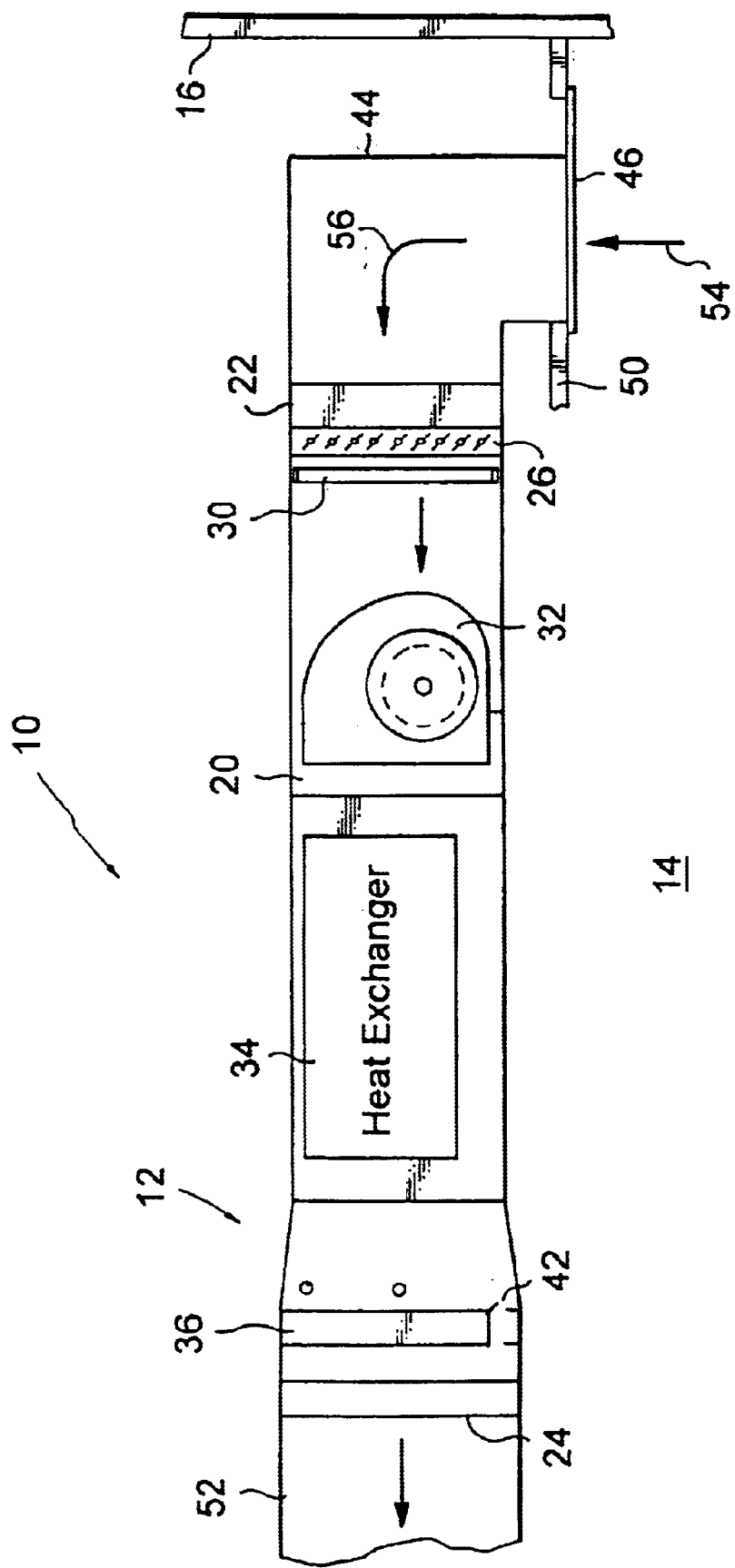
FIG. 1 schematically illustrates an air handling unit embodying teachings of the present invention.

FIG. 1 depicts an air handling unit 10 incorporating a liquid spray air treatment device, represented at 12. Unit 10, which may also be referred to as a heating, ventilation and air conditioning (HVAC) unit, serves an internal space 14 disposed within a building 16. The unit 10 is supported within that space, in a horizontal air flow orientation, on suitable support members, such as metal hanger rods or straps, secured to the building structure or substructure. Unit 10 includes a horizontally elongated hollow rectangular metal cabinet structure 20 having an open inlet end 22 and an open outlet end 24. From right to left as viewed in FIG. 1, the HVAC unit 10 has operatively disposed within its cabinet 20 a return air damper structure 26 adjacent the cabinet inlet end 22, a replaceable cartridge type air filter 30, a supply air blower 32, a heat exchanger 34, and a cooling coil 36. As examples, the heat exchanger 34 may be a steam or hot water supplied heat exchanger, and the cooling coil 36 may be supplied by a central chiller system. A sump 42 is located below the cooling coil 36 to collect moisture that condenses on the cooling coil.

A return air duct 44 is interconnected between the cabinet inlet end 22 of the HVAC unit 10 and a suitable return air grille 46 mounted on the underside of the ceiling 50 of the conditioned space. At the opposite end of the unit 10, a main supply air duct 52 is connected to the cabinet outlet end 24 and extends horizontally through the above-ceiling space. Spaced apart branch supply air ducts (not shown) are preferably interconnected between the bottom of the main supply air duct 52 and a series of supply air diffusers mounted on the underside of the ceiling 50 of the conditioned space 14.

In operation, when HVAC unit 10 is called upon for heating or cooling, the blower 32 draws return air 54 upwardly into the cabinet 20, through the return air grille 46 and the return air duct 44, as represented at 56, and then forces the air through the unit 10, across the heat exchanger 34 and the cooling coil 36, and into the main supply air duct 52. The heated or cooled air forced into the main supply air duct 52 is discharged into the space 14, in the form of conditioned air, through the branch supply ducts and the ceiling mounted air diffusers.

The HVAC unit 10 illustrated in FIG. 1 is merely representative of a wide variety of units into which the air treatment system 12, which will be subsequently described herein, may be operatively incorporated. For example, while the unit 10 has been illustratively described as being adapted to both heat and cool the conditioned space 14, it could alternatively be a cooling-only unit.

Figure 2:
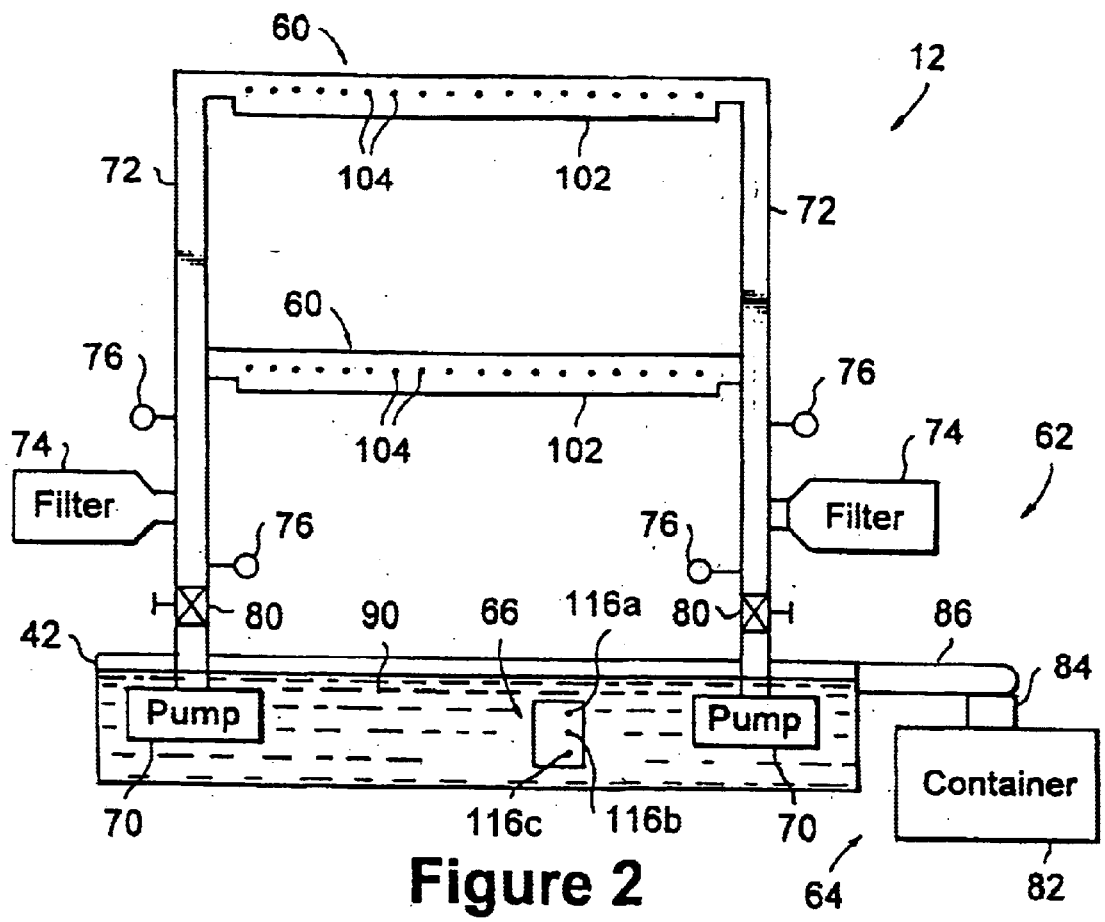
FIG. 2 shows in greater detail an air purification device of the air handling unit.

With reference now to FIGS. 1 and 2, the air purification device 12 includes one or more spray headers 60 and pumping system 62, and preferably device 12 further includes a make-up solution system 64 and a control system schematically represented at 66. More specifically, pumping system 62 includes one or more pumps 70 and one or more solution lines 72, and preferably system 62 further includes filters 74, filter gauges 76, and valves 80. Also, make-up system 64 includes container 82, pump 84 and solution line 86.

Generally, each of the spray headers 60 is secured inside unit cabinet 20 closely adjacent cooling coil 36; and pumping system 62 is connected to the sump 42 and to the spray headers for drawing liquid solution from the sump and pumping the solution to and through the spray headers. The spray headers 60 then spray the solution onto the cooling coil 36, and the solution flows downward over the coil. In this way, as the air is forced through coil, the solution treats the air stream flowing through the coil. From coil 36, the solution flows into sump 42, from where the solution, represented at 90, can be re-circulated.

A variety of different types of liquid solutions can be employed in the practice of this invention. For instance, an odorless bleach solution can be used to kill bacteria in the air stream flowing through the air handling unit 10. It should be noted, though, that many other solutions can also be used in the air treatment device 12.

The specific embodiment of air purification device 12 shown in FIG. 2 includes two spray headers 60, each of which is comprised of a tube or pipe 102 having a series of openings, or ports, 104 formed or drilled therein and through which the solution is sprayed. Each of the spray headers 60 horizontally extends across cooling coil 36 (shown in FIG. 1), with both of the spray headers closely adjacent the cooling coil. One of the spray headers is above or closely adjacent the top of the cooling coil, and the other spray header is located about midway between the top and bottom of the cooling coil. Spray headers 60 may be positioned in locations other than as shown in FIG. 2, and device 12 may be provided with fewer or more spray headers 60 than are illustrated in FIG. 2 without departing from the scope of this invention.

As indicated above, openings 104 may be drilled in the spray headers 60, although any suitable procedure may be used to form these openings 104. Also, for example, the openings 104 in each spray header may be between 1/16 inch and 1/8 inch in diameter, and the openings may be spaced apart about 1/2 inch along the length of the spray header. Preferably openings 104 are formed at an angle of 90° to the axis of the spray header, so that the solution sprays outwardly, directly from the spray header and straight onto the cooling coil 36. The angle of these openings, it may be noted, could range, however, from 90 to 45°.

Figure 3:
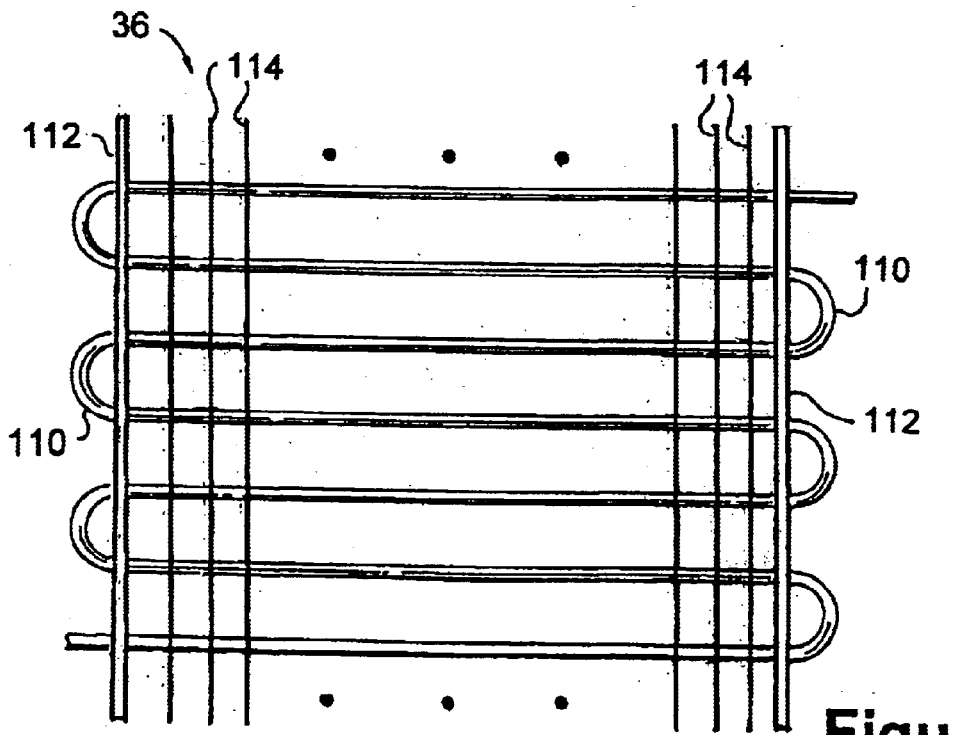
FIG. 3 represents a cooling coil that may be used in the air handling unit of FIG. 1.

In addition, as represented in FIG. 3, preferably, cooling coil 36 is of the plate-fin type—that is, the coil is comprised of a serpentine shaped coil 110 extending between two parallel end plates or supports 112, with a series of thin, parallel fins or plates 114 mounted on the coil. These fins are commonly made of aluminum, and may be spaced apart from 1/8 inch to 3/32 inch. Cooling coils of this type are very well known and are very common in HVAC units.

With the above parameters, air purification device 12, when used in air handling unit 10 as described, can be operated to kill virtually 100% of even extremely small bacteria, such as anthrax, that may be in the air stream conducted through the air handling unit. In particular, the spray headers 60 and the plate-fin cooling coil 36 may be used to develop and to maintain continuously a liquid spray filter that forces contact between the liquid spray and even extremely small particulates in the air stream. As a result, the liquid spray air treatment device is able to kill even extremely small bacteria such as anthrax.

With reference again to FIG. 2, preferably, as mentioned above, pumping system 62 includes one or more pumps 70 and one or more solution lines 72. Each of the pumps 70 is in communication with sump 42 to draw solution 90 therefrom, and each of the solution lines 72 extends from a respective one of the pumps 70 to spray headers 60 to conduct solution from the pump to the spray headers. With the embodiment of pumping system 62 illustrated in FIG. 2, pumps 70 are secured in sump 42, directly in the liquid solution 90 in the sump. As will be appreciated by those of ordinary skill in the art, any suitable sump and pressure pumps 70 may be used in the practice of this invention, and the pumps may be secured in place in any suitable way.

Also as indicated in FIG. 2, filters 74 may be disposed in lines 72, between pumps 70 and spray headers 60, to filter the solution conducted through the solution lines. In addition, when a filter is used in this way, a pair of pressure gauges 76 may be disposed in each solution line 72, on either side of the filter in that line to monitor the pressure drop across the filter. As will be understood, a pressure decrease on the supply gauge of more than a given amount may indicate that the filter has become clogged and needs to be replaced. A valve 80 may be located in each solution line 72, between the filter 74 in the line and the pump 70 connected to that solution line to shut off the solution line to facilitate replacing the filter or otherwise to stop or control the liquid flow through the solution line. Any suitable filters 74, gauges 76 and valves 80 may be employed in device 12.

Control system 66 may be provided to control automatically the operation of pumps 70. Preferably, the control system controls the pumps 70 as a function of the level of solution 90 in sump 42. In particular, each of the pumps 70 has a normally operating condition; however, when the level of solution in the sump falls below a given level, control system 66 deactivates the pumps 70. Also, if the pumps 70 have become deactivated because the solution in the sump has fallen below that level, control system 66 may re-activate the pumps when the solution rises back above that given level.

Make-up solution system 64 is provided to add solution to sump 42 to compensate for any solution that evaporates or otherwise is removed or lost during the operation of device 12. As mentioned above, make-up system 64 preferably comprises container 82, pump 84 and solution line 86. Container 82 holds a supply of the desired solution, pump 84 is connected to this container to draw solution therefrom, and solution line 86 is connected to pump 84 and to sump 42 to conduct solution from the pump to the sump. As those of ordinary skill in the art will recognize, any suitable container 82 and pump 84 may be utilized in the practice of the present invention.

Control system 66 may also be used to control operation of make-up solution system 64, and in particular, the operation of pump 84 thereof. Preferably, pump 84 is also controlled as a function of the level of solution 90 in sump 42. For instance, control system 66 may activate pump 84 to pump solution from container 82 to sump 42 when the level of solution in the sump falls below a first preset level, and to deactivate the pump 84 when the level of solution in the sump rises above a second preset level that is above the first preset level. In this way, control system 66 and make-up system 64 operate to maintain the solution 90 in sump 42 between these two, first and second preset levels.

Control system 66 may be comprised of any suitable specific elements or items. For example, the control system may be comprised of a series of float activated electric contacts, represented at 116a, 116b and 116c, that open and close as the level of solution in sump 42 falls below or rises above predetermined levels.

Figure 4:
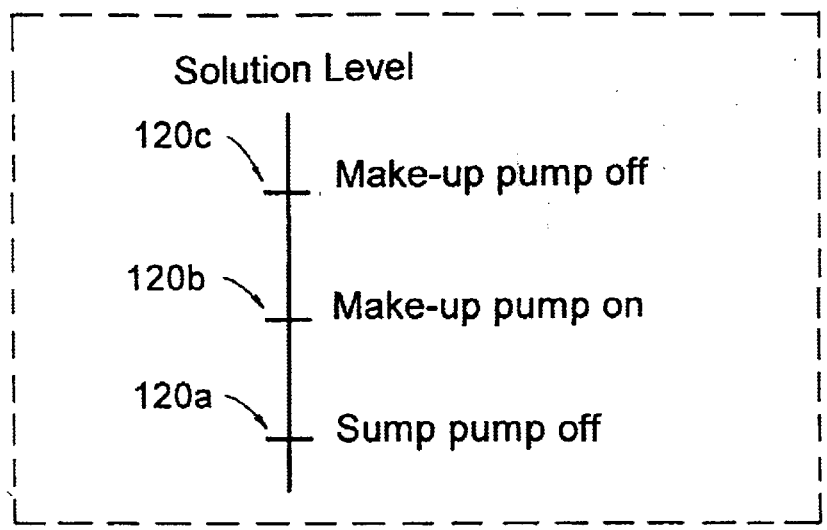
FIG. 4 illustrates the operation of a control system of the air purification device.

With reference to FIG. 4, with the preferred embodiment of the control system 66, which controls both pumps 70 and pump 84, the system employs three such contacts that are closed in sequence as the solution 90 in sump 42 rises above three sequential levels represented at 120a, 120b and 120c. The lowest 120a of these three levels is used to control pumps 70; and in particular, these pumps have a normally on, or operating, condition, and the pumps are turned off when the solution level falls below this level 120a. The next two levels 120b and 120c, both of which are above level 120a, are used to control operation of pump 84. Specifically, pump 84 is turned on when the solution falls below level 120b, and the pump is turned off when the solution rises above level 120a.

System 66 may be provided with other or additional types of alarms or controls. For instance, an alarm or a suitable overflow mechanism may be activated when the solution 90 in the sump 42 approaches the top of the sump.

Figure 5:
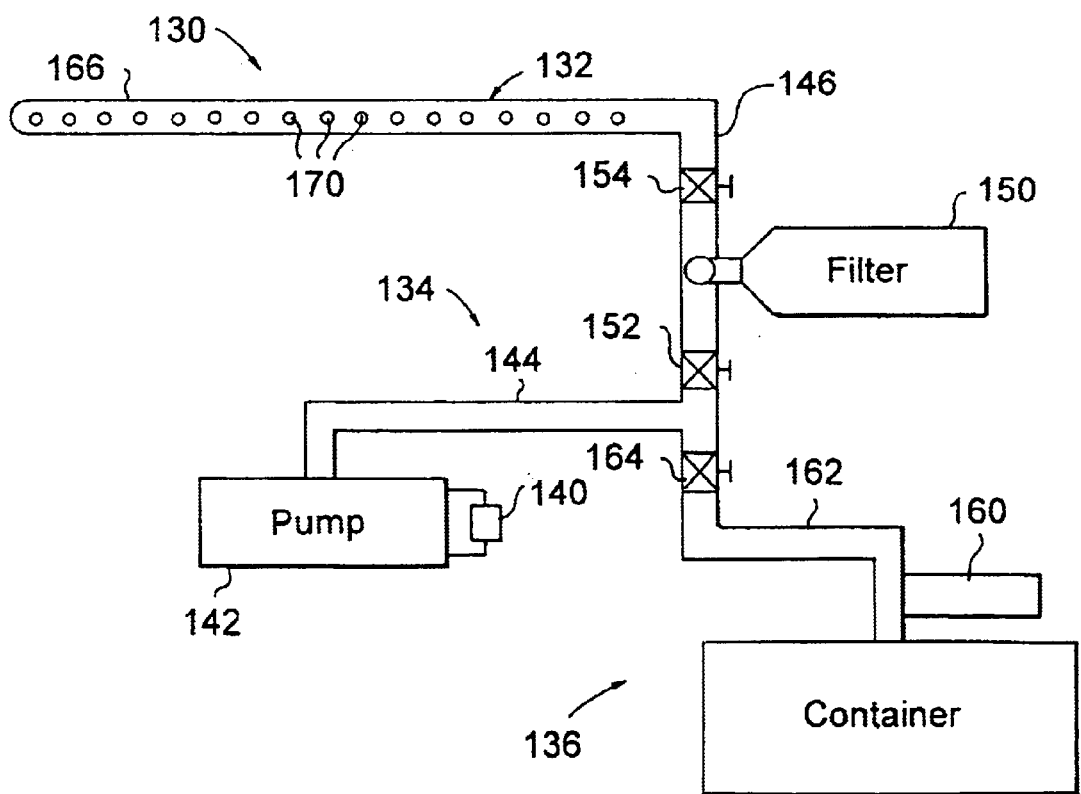
FIG. 5 shows an alternate air purification device that may be used in the air handling unit of FIG. 1.

FIG. 5 shows an alternate air purification device 130 for air handling unit 10. Device 130, similar to device 12, includes a spray header 132 and a pumping system 134, and preferably device 130 further includes a make-up solution system 136 and a control system 140. With the embodiment of the air purification device shown in FIG. 5, pumping system 134 includes pump 142, solution lines 144 and 146, filter 150 and valves 152 and 154, and make-up system 136 includes container 156, pump 160, solution line 162 and valve 164.

Generally, spray header 132 is comprised of a tube or pipe 166 having a series of openings 170 formed or drilled therein; and the spray header, when installed in unit 10, horizontally extends across casing 20, closely adjacent the top of cooling coil 36. Pump 142 is located in sump 42, draws the liquid solution therefrom and directs the solution through lines 144 and 146 and then through spray header 132. The spray header then sprays the solution onto cooling coil 36, and the solution flows downward over the cooling coil, treating the air passing through the coil. From the cooling coil, the solution flows into the sump 42, from where the solution can be recirculated. Filter 150 may be located in line 146 to filter the solution flowing therethrough, and valves 152 and 154 may be located in line 146 to shut-off the solution flow, for example when filter 150 is replaced.

As in device 12, many different types of liquid solutions can be used in air treatment device 130. In an application that may be particularly useful, an odorless bleach solution can be used to kill bacteria in the air stream flowing through the air handling unit 10. Many other solutions or types of solutions can also be used in the air treatment device 130.

Make-up solution system 136, similar to system 64 of device 12, is used to add to the circulating solution. With system 136, however, the make-up solution is conducted to line 146 rather than being added directly to sump. More specifically, container 156 holds a supply of the desired solution, line 162 is connected to the container and to line 146, and pump 142 is used to draw solution from container 156 and to pump the solution through line 162 and into line 146. Valve 164 may be located in line 162 to control the flow of solution therethrough.

Control system 140 may be provided to control operation of pumping system 134 and make-up system 136, specifically pumps 142 and 160 thereof. These pumps also may be controlled as functions of the level of the solution 90 in sump 42, although other suitable control procedures may also be used.

Air purification devices 12 and 130 are very well suited to be installed on a retrofit basis in many existing air handling units. To elaborate, and with reference again to FIG. 1, many existing air handling units include casing 20, heat exchanger 34, cooling coil 36, and blower 32. Moreover, existing air handling units also typically already include sump 42 to collect moisture that condenses on the cooling coil 36. Air purification devices 12 and 120 can be installed in such an air handling unit without requiring any significant alteration of heat exchanger 34, cooling coil 36, blower 32, or even sump 42. Indeed, perhaps the most significant change to any of these items that may be needed is simply to plug or close off the usual bottom drain opening in the sump.

To install device 12 in the air handling unit 10, spray headers 60, pumps 70 and solution lines 72 are installed, and preferably, control system 66 and make-up system 64 are also installed. Each of these items can be easily installed in a variety of ways. For example, spray headers 60 can be secured in place by metal hanger rods or straps connected to the top or side of casing 20, or via support plates or brackets connected to the sides of the casing. Likewise, pumps 70 can be bolted in place inside sump 42.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of retrofitting an air handling unit including a casing having an inlet and an outlet, a cooling coil for cooling air, a sump located beneath the cooling coil for collecting water, and a supply air blower for drawing air into the inlet, forcing the air through the cooling coil, and outward through the outlet, the method comprising:
    installing a spray header inside the duct and adjacent the cooling coil fin spraying a liquid solution onto the cooling coil; and
    installing a pumping system for drawing the solution from the sump and pumping the solution from the sump to and through the spray header, wherein the spray header flows the solution onto the cooling coil, and the solution flows downward along the cooling coil and into the sump, and the solution treats the air stream forced through the cooling coil.

2. A method according to claim 1, wherein the liquid solution is an anti-bacteria solution, and the solution kills bacteria in the air forced through the cooling coil.

3. A method according to claim 1, further comprising the step of installing a control system to control automatically operation of the pumping system.

4. A method according to claim 3, wherein:
    the step of installing the pumping system includes the steps of installing a pump in communication with the sump for drawing the solution therefrom, and connecting the pump to the spray header to conduct the solution from the pump to the spray header, and
    the control system is used to control operation of the pump.

5. A method according to claim 4, wherein the pump has normally operating stage to pump solution to the spray header, and the control system deactivates the pump when the solution in the stamp falls below a given level.

6. A method according to claim 3, further comprising the step of installing a make-up solution system for conducting solution to the sump to compensate for solution that is lost.

7. A method according to claim 6, wherein the control system also controls operation of the make-up solution system.

8. A method according to claim 7, wherein:
    the make-up system includes a supply of the solution, and a make-up pump for drawing the solution from the supply and adding the solution to the sump; and
    the control system also controls operation of the make-up pump.

9. An air handling unit, comprising:
    a casing defining a space for conditioning air, and forming an inlet and an outlet;
    a cooling coil disposed inside the casing for cooling air therein;
    a sump located below the cooling coil for collecting liquid condensing on the cooling coil;
    a supply air blower for drawing air into the casing, through the inlet, and forcing air through the cooling coil and outward through the outlet;
    a spray header secured inside the casing, adjacent the cooling coil; and
    a pumping system connected to the sump and to the spray header for drawing liquid solution from the sump and pumping the solution to and through the spray header, wherein the spray header flows the solution onto the cooling coil and the solution flows downward over the cooling coil and into the sump below, and the solution treats the air flowing through the cooling coil.

10. An air handling unit according to claim 9, wherein to cooling coil is fed from a central chiller.

11. An air handling unit according to claim 10, wherein the liquid solution is an anti-bacteria solution, and the solution kills bacteria in the air forced through the cooling coil.

12. An air handling unit according to claim 10, wherein the pumping system includes:
    a pump in fluid communication with the sump for drawing solution therefrom;
    a solution line connected to the pump and to the spray header for conducting solution from the pump to the spray header; and
    a control system for controlling operation of the pump.

13. An air handling unit according to claim 12, wherein the control system deactivates the pump when the solution in the sump falls below a given level.

14. An air handling unit according to claim 12, further comprising a solution make-up system connected to the sump for adding solution thereto.

15. An air handling system according to claim 14, wherein:
    the make-up solution system includes
        i) a container holding a supply of the solution,
        ii) a make-up pump connected to the container for drawing the solution therefrom, and
        iii) a make-up solution line connected to the make-up solution pump and to the sump for conducting solution from the make-up pump and into the sump; and
    the control system activates the make-up pump to draw solution from the container and to direct the solution through the make-up solution line and into the sump when the level of solution in the stamp falls below a preset level.

16. A method of retrofitting and using an existing air handling unit to treat air, the existing air handling unit including a casing having an inlet and an outlet, a cooling coil for cooling air, a sump located beneath the cooling coil for collecting liquid, and a supply air blower for drawing air into the inlet and, forcing the air through the heat exchanger and the cooling coil and outward through the outlet, the method comprising:

installing a spray header inside the duct, adjacent the cooling coil;

installing a pumping system in fluid communication with the stamp and the spray header;

using the pumping system to conduct a liquid solution to the spray header;

using the spray header to spray the liquid solution onto the cooling coil, wherein the liquid solution flows downward along and then off from the cooling coil to treat the air forced through the cooling coil; and using the existing sump of the air handling unit to coiled the liquid solution flowing off from the cooling coil.

17. A method according to claim 16, wherein the liquid solution is an anti-bacteria solution, and the solution kills bacteria in the air forced through the cooling coil.

18. A method according to claim 16, further comprising the steps of:

installing a make-up solution system for adding solution to the sump;

operating the pumping system as a function of the level of the solution in the sump; and also operating the make-up solution system to selectively add solution to the sump as a function of the level of the solution in the sump.

19. A method according to claim 18, wherein:

the step of installing a make-up solution system includes the step of providing a make-up solution pump;

the step of installing the pumping system includes the step of securing a sump pump in the sump;

the step of operating the make-up solution system includes the steps of activating the make-up pump when the level of the solution in the sump falls below a first preset level, and deactivating the makeup pump when the level of solution in the swap rises above a second preset level, above the first preset level; and the step of operating the pumping system includes the step of deactivating the sump pump when the level of solution in the sump falls below a third preset level.

* * * * *